(12) United States Patent  (10) Patent No.: US 7,758,122 B2
Haida et al.  (45) Date of Patent: Jul. 20, 2010

(54) LOCKING DEVICE

(75) Inventors: Stefan Haida, Remscheid (DE); Kirubaharan Reginold Albert, Burscheid (DE)

(73) Assignee: Johnson Controls GmbH, Burscheid (DE)

( * ) Notice: Subject to any disclaimer, the term of this patent is extended or adjusted under 35 U.S.C. 154(b) by 441 days.

(21) Appl. No.: 11/547,151

(22) PCT Filed: Mar. 1, 2005

(86) PCT No.: PCT/EP2005/002124

§ 371 (c)(1), (2), (4) Date: Oct. 6, 2006

(87) PCT Pub. No.: WO2005/097544

PCT Pub. Date: Oct. 20, 2005

(65) Prior Publication Data

US 2007/0216171 A1   Sep. 20, 2007

(30) Foreign Application Priority Data

Apr. 7, 2004  (DE) .................... 10 2004 017 592

(51) Int. Cl.
*B60N 2/02* (2006.01)
*B60N 2/10* (2006.01)
*B60N 2/14* (2006.01)

(52) U.S. Cl. ...................................... 297/336; 297/335
(58) Field of Classification Search ................. 297/336, 297/335; 296/65.03, 65.05, 65.09, 65.16
See application file for complete search history.

(56) References Cited

U.S. PATENT DOCUMENTS

| 5,150,933 | A |   | 9/1992  | Myslicki et al. |
| 5,562,322 | A | * | 10/1996 | Christoffel ............... 296/65.03 |
| 5,711,505 | A | * | 1/1998  | Nemoto ...................... 248/424 |
| 5,722,727 | A | * | 3/1998  | Unckrich .................... 297/336 |
| 6,123,379 | A | * | 9/2000  | Yamada et al. ........... 296/65.03 |
| 6,412,849 | B1| * | 7/2002  | Fast ......................... 296/65.03 |
| 6,629,710 | B1|   | 10/2003 | Shafrey et al. |
| 6,883,854 | B2| * | 4/2005  | Daniel ..................... 296/65.03 |

FOREIGN PATENT DOCUMENTS

| DE | 195 22 721 A1 | 1/1996 |
| DE | 198 48 231 A1 | 8/1999 |
| EP | 1 068 985 A1  | 1/2001 |
| GB | 2 231 617 A   | 11/1990 |

OTHER PUBLICATIONS

International Search Report for PCT/EP2005/002124, date of mailing Jul. 5, 2005, 2 pages.
German Examination Report dated Jan. 10, 2005, 3 pages.

* cited by examiner

*Primary Examiner*—David Dunn
*Assistant Examiner*—Tania Abraham
(74) *Attorney, Agent, or Firm*—Foley & Lardner LLP

(57) ABSTRACT

A device for locking and/or unlocking a component (e.g., in or on a vehicle, etc.) in relation to a mating element is provided. The device comprises a locking element and a blocking element. The locking element is configured to be set into a locking position and into an unlocking position. The blocking element is configured to be set into a blocking position and into an actuating position. The setting of the blocking position brings about the setting of the locking position and the setting of the actuating position favors the adoption of the unlocking position.

14 Claims, 5 Drawing Sheets

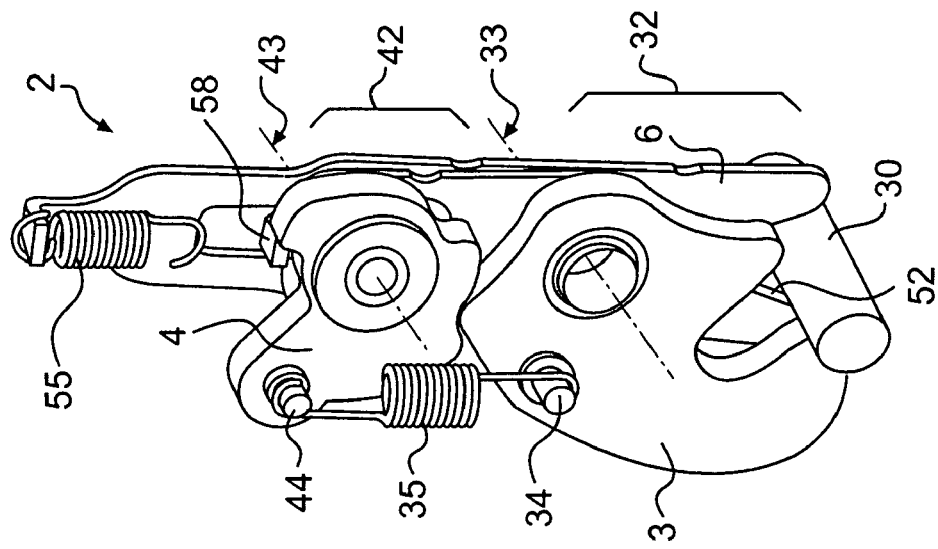
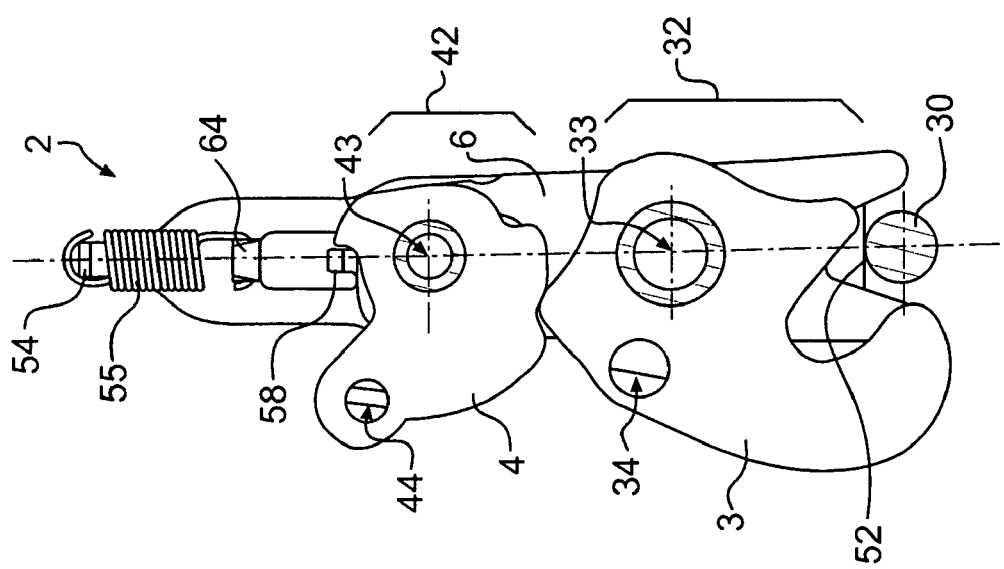

LOCKING DEVICE

CROSS-REFERENCE TO RELATED PATENT APPLICATIONS

The present Application is a National Phase Application of PCT/EP2005/002124 entitled, "Device for Locking and/or Unlocking a Component, in particular in/or on a Vehicle and Method" filed on Mar. 1, 2005 which published under PCT Article 21(2) on Oct. 20, 2005 as WO 2005/097544 A1 in the German language, which claims priority to German Patent Application DE 10 2004 017 592.6 filed Apr. 7, 2004, the entire disclosure of which, including the specification and drawings, is expressly incorporated herein by reference.

BACKGROUND

The present invention relates to a locking device for locking and/or unlocking a component in relation to a mating element. More specifically, the present invention relates to a locking device for use in or on a vehicle wherein the locking device has a locking element and a blocking element, the locking element being able to be set into a locking position and into an unlocking position, the blocking element being able to be set into a blocking position and into an actuating position, and the setting of the blocking position bringing about the setting of the locking position.

Locking devices of this type are known. Such locking devices are sometimes used in vehicles (e.g., motor vehicles, etc.) when components are: (1) moveable to different positions; and (2) have to be retained in at least one of these positions counter to a relatively large force (e.g., a force occurring in an accident situation, etc.). For example, in the case of removable vehicle seats, the vehicle seats have to first be retained fixedly in their normal position (i.e. their use position) in which they provide a seat for the vehicle occupants and then they have to be folded over, for example to make it easier for vehicle occupants to get to a rear seat bench or else to enlarge the volume of the loading space. To secure a vehicle seat in such positions, it is known in general to use reversible falling-latch-type locks, in which a hook can either retain or lock a bolt situated on the opposite side or else can unlock it. In such locks, the hook conventionally has two different setting positions, with a hook of this type conventionally "snapping" actively at least into its locking position. This is the case when the bolt on the opposite side enters the region of engagement of the hook, with the result that, by the hook being locked or by it adopting its locking position, a fixed retention or locking is possible. However, it may be possible that the hook will also spring or snap erroneously into the locking position which may be difficult to detect by a user.

Furthermore, in known blocking closures, it is generally the case that a blocking pawl or a blocking cam has to be brought into an open position before the hook is opened or unlocked, but, for correct functioning, it has to be ensured that the bolt on the opposite side of the blocking closure is also actually unlocked (i.e. moves out of the engagement region of the hook). It is possible that again the hook will snap or drop into its locking position without the bolt being locked.

Accordingly, there is a need for a locking device (e.g., a locking device suitable for use with a vehicle seat, etc.) that is simple to manufacture, is compact in terms of construction space (e.g., owing to a vertical arrangement of a hook and blocking element, etc.), can be produced cost-effectively, and which avoids the disadvantages of the prior art.

SUMMARY

One exemplary embodiment relates to a device for locking and/or unlocking a component (e.g., in or on a vehicle seat, etc.) in relation to a mating element. The device includes a locking element and a blocking element. The locking element is configured to be set into a locking position and into an unlocking position. The blocking element is configured to be set into a blocking position and into an actuating position. The setting of the blocking position brings about the setting of the locking position and the setting of the actuating position favors the adoption of the unlocking position.

Another exemplary embodiment relates to a device for locking and/or unlocking a component (e.g., in or on a vehicle, etc.) in relation to a mating element. The device having a locking element and a blocking element. The locking element is configured to be set into a locking position and into an unlocking position. The blocking element is configured to be set into a blocking position and into an actuating position. The setting of the blocking position brings about the setting of the locking position. The device further comprises an ejection element. The ejection element is configured to be set into an ejection position and into a clamping position. The setting of the ejection position brings about an unlocking of the mating element by the locking element. The setting of the clamping position onto the mating element to be locked causes a force which acts in the direction of the unlocking position and opposes a locking. Such a configuration may advantageously reduce the probability of a misuse of the device by a user.

According to an exemplary embodiment, the setting of the ejection position causes the setting of the actuating position. This has the advantageous effect that there is no reduction in the locking security and on the contrary an opening or unlocking of the mating element is possible only after the blocking element is actuated.

According to another exemplary embodiment, the locking element is a hook and, in particular, that the locking element and the blocking element are connected by means of a first spring means. Such a configuration may allow the device to be produced cost-effectively in a simple manner and with particularly simple means.

According to another exemplary embodiment, the locking element is arranged rotatably about a first axis of rotation, and that the blocking element is arranged rotatably about a second axis of rotation. By this means, the elements can be realized with comparatively little friction, thus providing reliable operation of the device.

According to another exemplary embodiment, the device has a guide element, the guide element defining the arrangement of the locking element and of the blocking element relative to each other, in particular defining the first and second axes of rotation. In a particularly advantageous manner, the guide element has the effect that the mating element can only be locked in a single position by the hook or by the locking element. As a result, the reliability of use of the device is increased.

According to another exemplary embodiment, the ejection element is a sliding plate which can be displaced in relation to the locking element and/or the blocking element and is pre-stressed toward the ejection position by means of a second spring means. Such a configuration may provide a reliable unlocking of the device that can be brought about with extremely simple means.

Another exemplary embodiment relates to a method for locking and/or unlocking a component (e.g., in or on a vehicle, etc.) in relation to a mating element. The component comprises a locking element and an ejection element. The locking element is configured to be set into a locking position and into an unlocking position. The ejection element is configured to be set into an ejection position and into a clamping position. The setting of the ejection position favors the adoption of the unlocking position, and, in order to set the locking position, a force being exerted on the ejection element or on the component by the mating element. Such a configuration may prevent random influences from closing the clamping hook or the blocking hook. Before any locking, a comparatively large force is to be applied in order to set the clamping position of the ejection element or at least in order to move the ejection element out of its ejection position, with the desired locking reliably being ensured following this. Due to the comparatively large application of force in order to set the clamping position, it is unlikely that a user of the component will set the ejection element inadvertently into the clamping position and thereby impair the functionality of the component.

According to an exemplary embodiment, a stop or a first control component of the ejection element blocks the locking element and/or a blocking element if the ejection element is in its ejection position. This enables the effect of the first spring means, which has a tendency to act in the direction of setting the locking position, to be blocked in the ejection position of the ejection element. When carrying out the entire locking of the mating element, the ejection element is brought into its clamping position, with the stop or the first control component of the ejection element first of all releasing the blocking element or the locking element, as a result of which the locking element moves out of the static unlocking position and, in the process, is followed by the blocking element, for example owing to the stressing of the first spring means, until the locking element is set in its locking position.

According to another exemplary embodiment, during the unlocking of the component, the ejection element has, owing to the prestressing of a second spring means, at least an effect assisting the removal of the component from the mating element. In particular, it is advantageously possible as a result that the component can be raised in relation to the mating element, but at least the separation of the two can be assisted.

According to another exemplary element, the locking element is arranged rotatably about a first axis of rotation and the blocking element is arranged rotatably about a second axis of rotation. The ejection element is guided in a manner such that it can move freely parallel to the section connecting the axes of rotation. This can take place in a particularly advantageous and particularly simple manner by means of guide elements.

According to another exemplary embodiment, the component has a blocking element, the blocking element being able to be set into a blocking position and into an actuating position, and in particular the setting of the blocking position causing the setting of the locking position. By this means, the functionality of the component or of the device can be further increased.

BRIEF DESCRIPTION OF THE DRAWINGS

FIG. 5 is a side view of a locking device according to another exemplary embodiment and shown in an unlocked position.

FIG. 6 is a perspective view of the locking device of FIG. 5 shown in the unlocked position.

DETAILED DESCRIPTION

Figure 10:
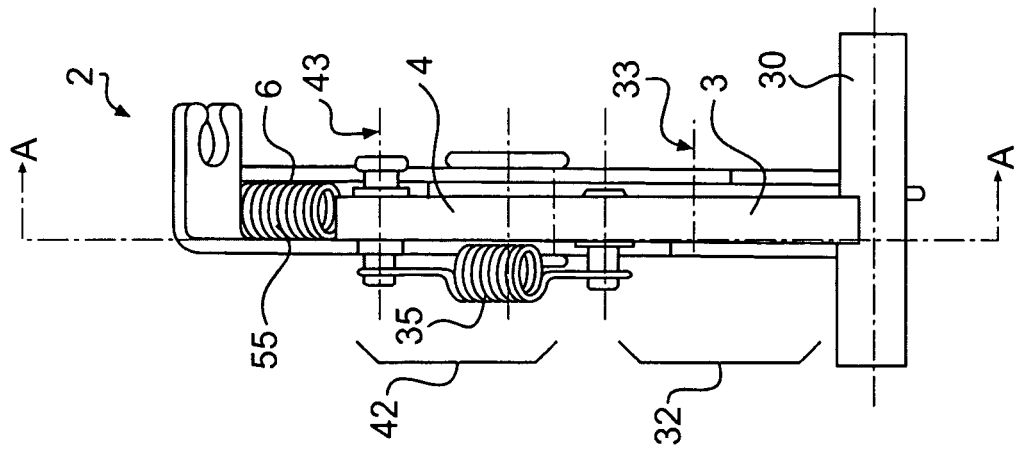
FIG. 10 is a front view of the locking device of FIG. 9 shown in the unlocked position.

FIGS. 1 through 10 illustrate a device 2 according to various exemplary embodiments. FIGS. 1, 2, 7 and 8 illustrate the device 2 in a locked position, while FIGS. 3, 4, 5, 6, 9 and 10 illustrate the device 2 in an unlocked position. Further, FIGS. 1, 4, 5, 8 and 9 each illustrate a side view of the device 2, FIGS. 2, 3, 6 and 7 each illustrate a perspective view of the device 2, while FIG. 10 illustrates a front view of the device 2.

Figure 2:
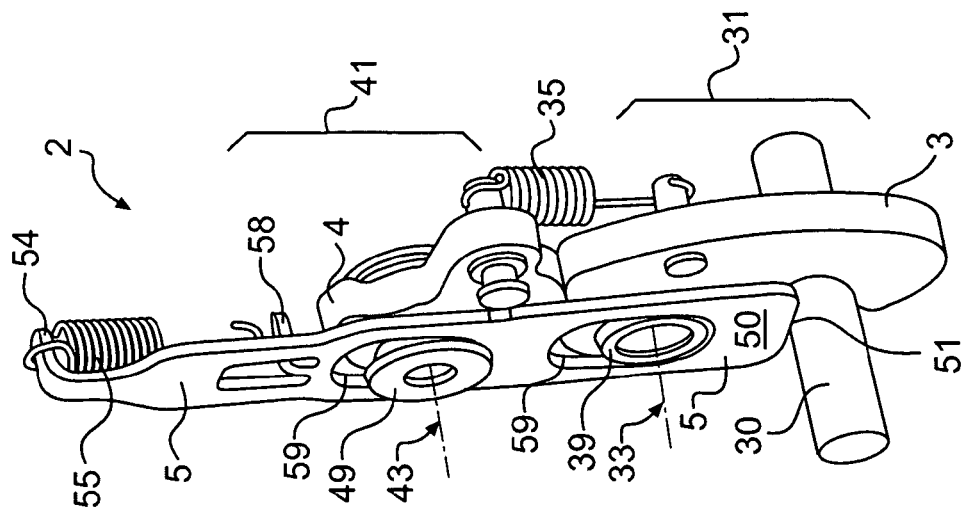
FIG. 2 is a perspective view of the locking device of FIG. 1 shown in the locked position.
Figure 1:
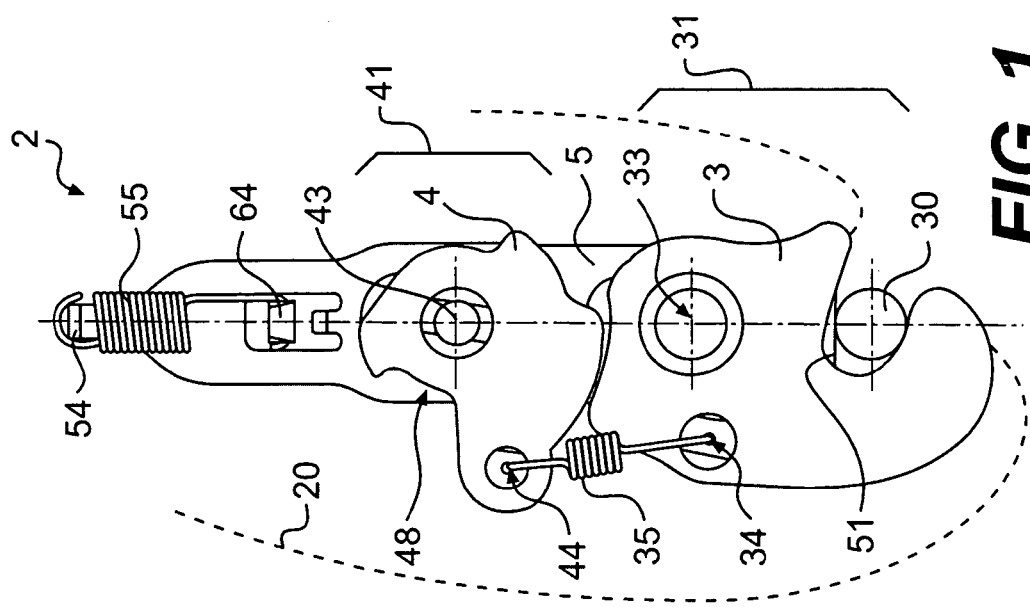
FIG. 1 is a side view of a locking device according to an exemplary embodiment and shown in a locked position.
Figure 4:
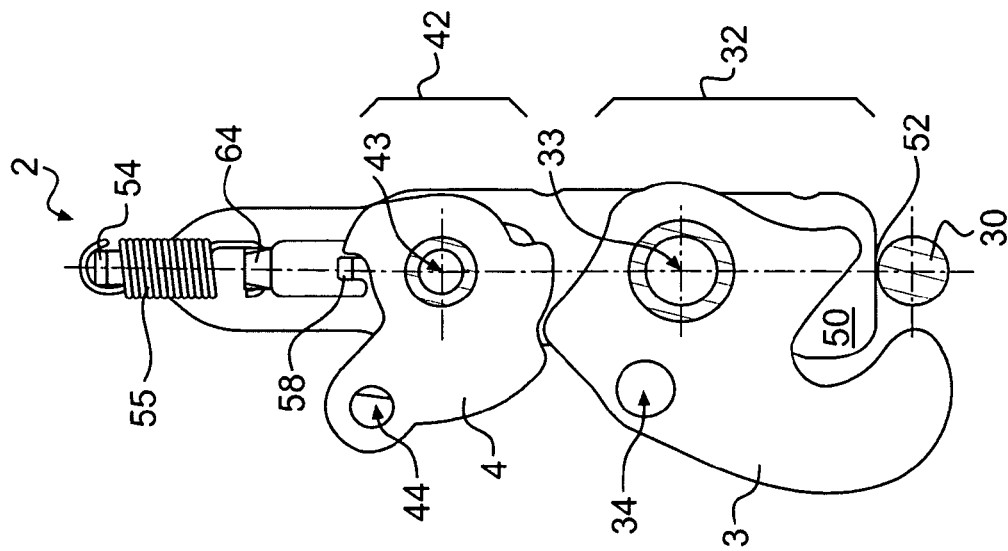
FIG. 4 is a side view of the locking device of FIG. 1 shown in the unlocked position.
Figure 3:
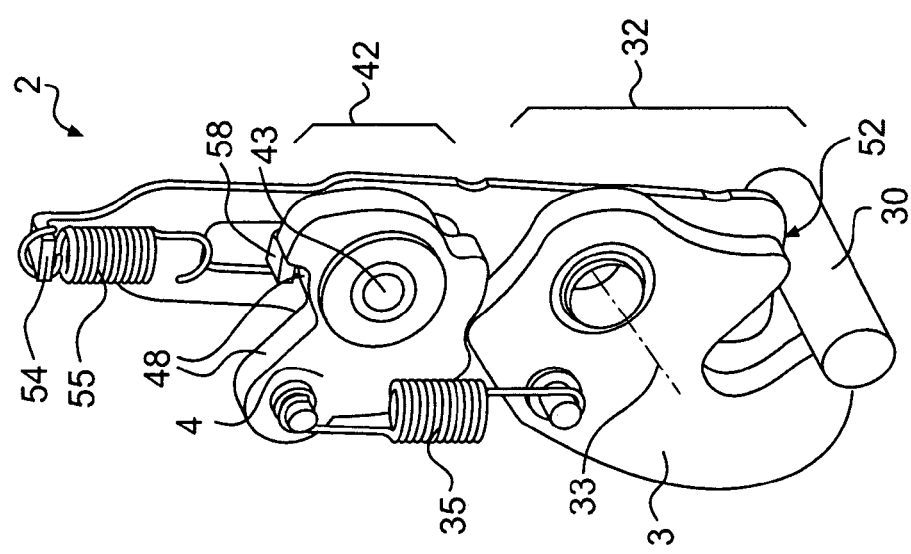
FIG. 3 is another perspective view of the locking device of FIG. 1 shown in an unlocked position.
Figure 8:
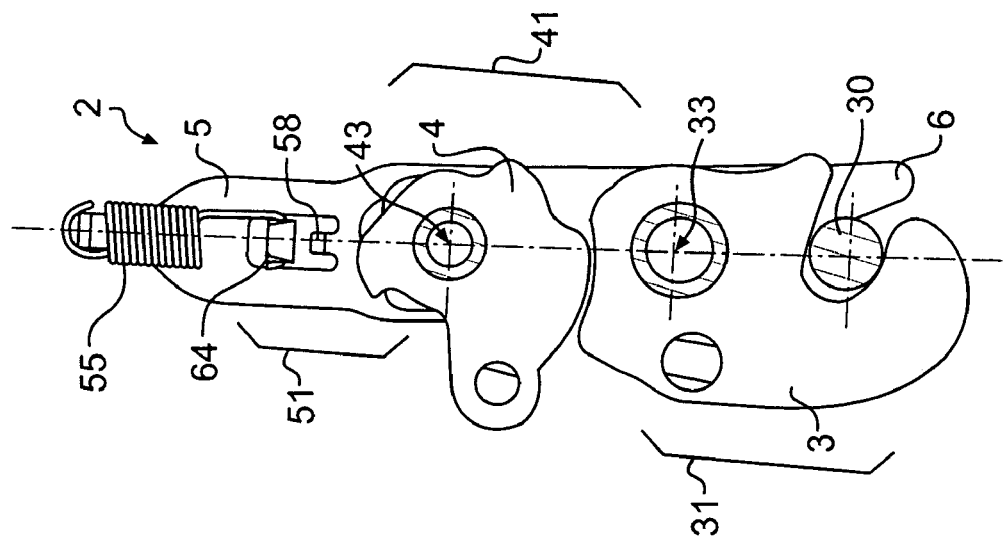
FIG. 8 is a side view of the locking device of FIG. 5 shown in the locked position.
Figure 7:
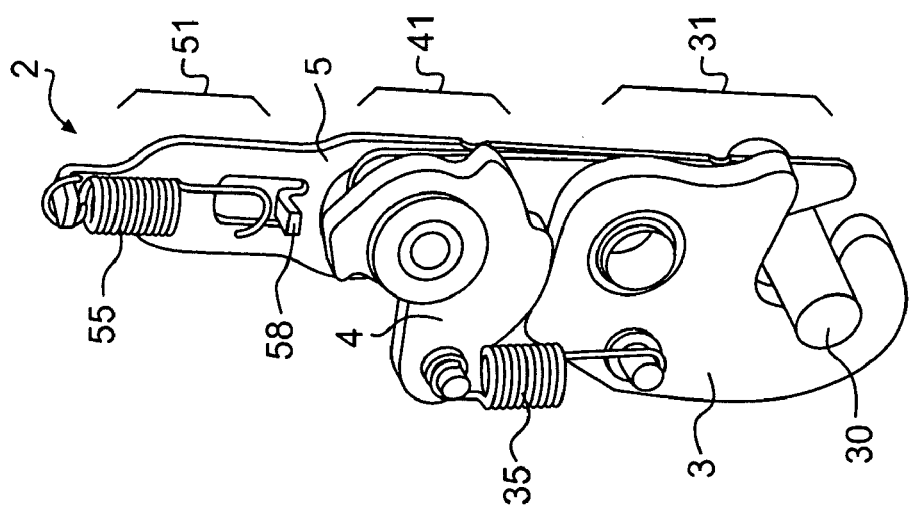
FIG. 7 is a perspective view of the locking device of FIG. 5 shown in a locked position.

Referring generally to all of the FIGURES, the device 2 is suitable for use within a vehicle (e.g., a motor vehicle, etc.) and is configured to selectively latch or otherwise lock a component 20 relative to the vehicle. For example, in certain situations, the device 2 may be configured to temporarily lock the component 20 to a mating component (not specially designated). In other situations, the locking is to be cancelled and an unlocked state is to be brought about. It should be noted that in the FIGURES, only a mating element 30 of the mating component is illustrated. Otherwise, the device 2 is essentially completely accommodated on the component 20 or is fastened thereto. In FIG. 1, the component 20 is indicated by means of a dashed line. The component 20 may be, for example, a seat or another moveable component in or on a motor vehicle.

The device 2 comprises a locking element, shown as a hook 3, which is configured to rotate, at least within limits, about a first rotational axis 33. According to various alternative embodiments, the locking element may take a form other than a hook. For example, a slide or the like are also possible for the locking element. However, by way of example, only the embodiment of the locking element as a hook 3 will be described below. The hook 3 can be set in a locking position 31 and in an unlocking position 32. The locking position 31 of the hook 3 is illustrated in the figures which illustrate the device 2 in its locked position (i.e. FIGS. 1, 2, 7 and 8). The other FIGURES show the hook 3 in its unlocking position 32.

The device 2 further comprises a blocking element 4 which, according to the embodiment illustrated, is also rotatably arranged on the device 2. The blocking element 4 is rotatable, at least within limits, about a second axis of rotation 43. The blocking element 4 is also referred to as a blocking cam 4. The blocking element 4 can be set in a blocking position 41 and in an actuating position 42. The blocking position 41 of the blocking element 4 corresponds to the locking position 31 of the locking element 3. The blocking position 41 is illustrated in FIGS. 1, 2, 7 and 8. Correspondingly, the actuating position 42 of the blocking element 4 is illustrated in FIGS. 3, 4, 5, 6, 9 and 10.

The first axis of rotation 33 and the second axis of rotation 43 are defined by means of a guide element 6, which is shown in FIGS. 5, 6, 8 and 10 (i.e. the guide element 6 defines the positions of the locking element 3 and of the blocking element 4), in particular their axes of rotation 33, 43, relative to each other. At a distance from the respective axes of rotation 33 and 43, the locking element 3 includes a first engagement point 34 and the blocking element 4 includes a second engagement point 44.

A first spring means 35 is arranged between the first engagement point 34 and the second engagement point 44. The first spring means 35 has a tendency to bring the first engagement point 34 and the second engagement point 44 closer to each other (i.e. biases the first engagement point 34 and the second engagement point 44 toward each other). According to the embodiment illustrated, the lever arm is larger in the direction of force of the first spring element 35 on the blocking element 4 than on the locking element 3. As such, without other influences, as the locking element 3 and the blocking element 4 rotate about their respective axes of rotation 33, 43, the locking element 3 has the tendency, due to the first spring means 35, to latch into its locking position 31 in which the locking element 3 is held by the blocking element 4 (which is in its blocking position 41).

According to an exemplary embodiment, the device 2 further comprises an ejection element 5 which, by means of elongated holes 59, is arranged displaceably relative to the axes of rotation 33, 43 and also displaceably relative to the locking element 3 or the blocking element 4. The ejection element is arranged in a manner such that it is guided by means of guide elements (shown in FIG. 2), namely a second guide element 49 connected, in particular, integrally to the blocking element 4, and a first guide element 39 connected, in particular, integrally to the locking element 3.

In its lower region 50, it is possible for the ejection element 5 to be displaced into a region of the mating element 30 locked by the hook 3 when the device 2 is in its unlocked position. This is immediately apparent by a comparison of FIGS. 1 and 4. The ejection element 5 can likewise be set into two positions, namely into a clamping position 51 and into an ejection position 52. In FIGS. 1, 2, 7 and 8, the ejection element 5 is set in the clamping position 51 and in the other FIGURES the ejection element 5 is set in the ejection position 52.

As already indicated, the lower region 50 of the ejection element 5 is in a gripping region of the hook 3, in which the hook 3 would hold the mating element 30 in the locked position of the device. According to the embodiment illustrated, the ejection element 5 is prestressed in the direction of its ejection position 52 by means of a second spring means 55. Therefore, if the locking element 3 were moved straight into its unlocking position 32, the prestressing of the second spring element 55 would cause the mating element 30 to be pushed out of or ejected from the locking region of the hook 3. For this purpose, the second spring means 55 is connected to the ejection element 5 by means of a third engagement point 54, and the second spring means 55 is furthermore fastened by means of a fourth engagement point 64 which is situated on the guide element 6.

Figure 9:
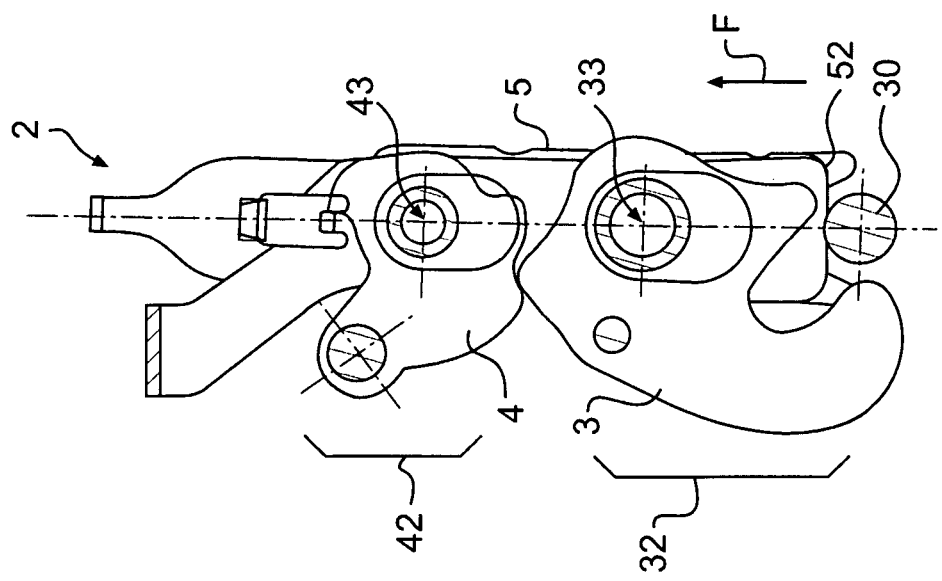
FIG. 9 is a side view of a locking device according to another exemplary embodiment and shown in an unlocked position.

Assuming that no mating element 30 is locked in the device 2, the ejection element 5 is set into its ejection position 52, which has the effect that a first control component 58 on the ejection element 5 in interaction with a second control component 48, which is arranged on the blocking element 4, in particular in the form of a recess, and that the blocking element 4 cannot be moved counterclockwise from its actuating position 42 into its blocking position 41. This has the consequence that, owing to the effect of the first spring means 35, the hook 3 likewise remains set in its unlocking position 32. This is a stable state which is unlikely to be changed even by random influences, such as small dynamic forces, on the hook or on the locking element 3. If the mating element 30 then comes into the vicinity of the locking region of the locking element 3, the mating element 30 moves the ejection element 5 from its ejection position into its clamping position or at least in the direction of its clamping position 51. For this purpose, a force which cannot be disregarded is required, as is illustrated in FIG. 9 by means of the designation F and an arrow. The force required depends on the strength of the second spring means 55. According to an exemplary embodiment, the force required may approximately 150 N. It is improbable that such a force would act on the specified place by chance. Therefore, a closing of the device arises essentially only on the basis of a movement of the mating element 30. Such a configuration may reduce malfunctioning of the device 2.

If the mating element 30 presses with the required force F in the direction indicated in FIG. 9, the ejection element 5 is moved somewhat in the direction of its clamping position 51. It is possible, after a certain distance, for the first control means 58, which is designed in particular as a lug or as a projection of the ejection element 5 projecting into the plane of rotation of the blocking element 4, for the blocking element 4 to now rotate in the counterclockwise direction (FIGS. 4, 5, 9), as a result of which, owing to the action of the first spring means 35 in the above-described manner, a locking both of the blocking element 4 and of the locking element 3 taking place (i.e. the locking element 3 is set into its locking position 31 and the blocking element 4 is set into its blocking position 41). This permits a reliable latching or locking of the mating element 30 on the component 20 by means of the device 2.

If the locking is now released, an actuating device (not illustrated) may be used, for example at the second engagement point 44 of the blocking element 4, to exert a movement in the clockwise direction of the blocking element 4 (cf. FIGS. 1, 8), i.e. from the blocking position 41 of the blocking element 4 into the actuating position 42 of the blocking element 4. Movement of the locking element 3 from its locking position 31 into its unlocking position 32 is made possible on account of the shaping both of the locking element 3 and of the blocking element 4 and is also brought about owing to the action of the first spring means 35, with the setting of the locking element 3 into the unlocking position 32 merely being favored. This in turn has the effect that, by means of the action of the second spring means 55, the ejection element 5 ejects the mating element 30 out of the locking means of the locking element 3.

The invention claimed is:

1. A device for locking and/or unlocking a component in relation to a mating element, the device comprising:
a locking element having a locking position and an unlocking position, the locking element being arranged about a first axis of rotation;
a blocking element having a blocking position and an actuating position, the blocking element being arranged about a second axis of rotation, wherein if the blocking element is moved to the blocking position, the locking element is moved to the locking position, and wherein if the blocking element is moved to the actuating position, the locking element is biased towards the unlocking position; and
an ejection element configured to be set into an ejection position and into a clamping position, the setting of the ejection position brings about an unlocking of the mating element by the locking element, and the setting of the clamping position results in a force that acts between the ejection element and the mating element, the ejection element is a plate defining a first hole corresponding to the first axis of rotation and a second hole corresponding to the second axis of rotation, the ejection element is configured to be displaced relative to the first axis of rotation and the second axis of rotation when moving between the ejection position and the clamping position, the ejection element is prestressed toward the ejection position by a spring.

2. The device of claim 1, wherein the setting of the ejection position causes the setting of the actuating position.

3. The device of claim 1, wherein the locking element is a hook.

4. The device of claim 1, further comprising a first spring connecting the locking element to the blocking element.

5. The device of claim 1, further comprising a guide element defining the arrangement of the locking element and of the blocking element relative to each other.

6. The device of claim 5, wherein the guide element defines the first axis of rotation and the second axis of rotation.

7. The device of claim 1, wherein the locking element has a locking region configured to receive the mating element when in the locking position, and wherein the setting of the ejection position causes the ejection element to eject the mating element from the locking region of the locking element.

8. The device of claim 7, wherein the ejection element ejects the mating element from the locking region of the locking element by pushing against the mating element.

9. The device of claim 7, wherein the ejection element is configured to block the mating element from entering the locking region of the locking element when in the locking element is in the unlocked position.

10. The device of claim 1, wherein the first hole and the second hole are elongated holes.

11. The device of claim 1, wherein the ejection element is configured to be displaced relative to the locking element and the blocking element.

12. A method for locking and/or unlocking a component in relation to a mating element, the method comprising:
 providing a locking element and an ejection element at the component;
 allowing the locking element to be set into a locking position and into an unlocking position;
 allowing the ejection element to be set into an ejection position and into a clamping position;
 providing a spring that pretensions the ejection element into the ejection position;
 using the mating element to set the locking position by having the mating element engage the ejection element and exert a force that moves the ejection element relative to the locking element from the ejection position to the clamping position against the force of the spring;
 providing a blocking element at the component, the blocking element being able to be set into a blocking position and into an actuating position, wherein the blocking element interacts with the locking element such that the setting of the blocking position of the blocking element causes the setting of the locking position of the locking element, wherein the locking element is arranged rotatably about a first axis of rotation and the blocking element is arranged rotatably about a second axis of rotation; and
 guiding the ejection element such that the ejection element can move freely parallel to a section connecting the first axis of rotation and the second axis of rotation.

13. The method of claim 12, wherein the ejection element, in its ejected position, blocks the mating element from getting in touch with at least one of the locking element and a blocking element.

14. The method of claim 12, wherein during the unlocking of the component, the ejection element pushes the mating element out of the component due to the force of the spring.

* * * * *